United States Patent
Soceanu et al.

(10) Patent No.: US 12,483,381 B2
(45) Date of Patent: Nov. 25, 2025

(54) NON-LINEAR APPROXIMATION ROBUST TO INPUT RANGE OF HOMOMORPHIC ENCRYPTION ANALYTICS

(71) Applicant: International Business Machines Corporation, Armonk, NY (US)

(72) Inventors: Omri Soceanu, Haifa (IL); Allon Adir, Kiryat Tivon (IL); Omer Yehuda Boehm, Haifa (IL); Boris Rozenberg, Ramat Gan (IL); Eyal Kushnir, Kfar Vradim (IL); Ehud Aharoni, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 18/207,187

(22) Filed: Jun. 8, 2023

(65) Prior Publication Data

US 2024/0413966 A1    Dec. 12, 2024

(51) Int. Cl.
*H04L 9/00* (2022.01)
*G06N 5/04* (2023.01)

(52) U.S. Cl.
CPC .............. *H04L 9/008* (2013.01); *G06N 5/04* (2013.01)

(58) Field of Classification Search
CPC ................... H04L 9/008; G06N 5/04
(Continued)

(56) References Cited

U.S. PATENT DOCUMENTS 11,522,671 B2 * 12/2022 Hiromasa ............. H04L 9/0618
11,562,230 B2 *  1/2023 Mohassel ............... G06N 3/084
(Continued)

FOREIGN PATENT DOCUMENTS

CN        116523074 A  *  8/2023   ............. G06N 20/00
WO   WO-2021219342 A1 * 11/2021  ............... G06N 5/01
(Continued)

OTHER PUBLICATIONS

Isik, et al., "Importance of Data Preprocessing for Neural Networks Modeling: The Case of Estimating the Compaction Parameters of Soils." Energy Education Science and Technology Part A: Energy Science and Research 2012 vol. 29(2): 871-882.
(Continued)

*Primary Examiner* — Tauqir Hussain
(74) *Attorney, Agent, or Firm* — Anthony M. Pallone (57) ABSTRACT

A technique for privacy-preserving homomorphic inferencing using a neural network having an activation function, such as a non-linear high-degree polynomial. The network is trained to learn input features of an input feature vector together with their associated inverses. During inferencing, an encrypted data point is received at the network. The data point comprises an input feature vector that has been extended with a set of one or more additional feature values, the set of one or more additional feature values having been generated by applying a normalized inverse function to respective one or more features in the feature vector. Homomorphic inferencing is performed on the encrypted data point using the machine learning model to generate an encrypted result, which is then returned. By applying the normalized inverse function, the high-degree polynomial can use any value of an input feature during inferencing, whether the value is within or outside of a particular input range.

14 Claims, 4 Drawing Sheets

(58) Field of Classification Search
USPC .......................................................... 380/28
See application file for complete search history.

(56) References Cited

U.S. PATENT DOCUMENTS

| | | | |
|---|---|---|---|
| 2007/0033427 A1 | 2/2007 | Correale et al. | |
| 2013/0304683 A1* | 11/2013 | Lo ........................ | G06N 3/088 706/20 |
| 2018/0164781 A1* | 6/2018 | Kubo ................. | G05B 19/4083 |
| 2019/0280868 A1* | 9/2019 | Streit .................... | G06N 3/045 |
| 2020/0005140 A1* | 1/2020 | Cherian ................ | G06N 3/045 |
| 2020/0036510 A1* | 1/2020 | Gomez ................. | H04L 9/008 |
| 2020/0304293 A1* | 9/2020 | Gama .................... | H04L 9/00 |
| 2020/0382228 A1* | 12/2020 | Studer ................ | H04B 17/3912 |
| 2021/0160221 A1* | 5/2021 | Barmpalios ......... | G06F 21/6245 |
| 2021/0174243 A1* | 6/2021 | Angel ................... | H04L 9/083 |
| 2021/0264201 A1* | 8/2021 | Pandey ............. | G06V 10/7715 |
| 2021/0376995 A1* | 12/2021 | Ratha ................... | H04L 9/0618 |
| 2021/0397988 A1* | 12/2021 | Sarpatwar ............. | G06N 3/04 |
| 2022/0005604 A1* | 1/2022 | Son ....................... | G16H 50/30 |
| 2022/0222539 A1* | 7/2022 | Klein .................... | G06N 3/088 |
| 2023/0023634 A1* | 1/2023 | Bringoltz .............. | G01B 11/02 |
| 2024/0413966 A1* | 12/2024 | Soceanu ................ | H04L 9/008 |

FOREIGN PATENT DOCUMENTS

| WO | WO-2023236628 A1 * | 12/2023 | ........... H04L 9/0861 |
|---|---|---|---|
| WO | WO-2025070102 A1 * | 4/2025 | ........... G06N 3/0475 |

OTHER PUBLICATIONS

Aboulatta, et al., "Stabilizing Inputs to Approximated Nonlinear Functions for Inference with Homomorphic Encryption in Deep Neural Networks," arXiv:1902.01870 [cs.LG]; DOI: 10.48550/arXiv.1902.01870; Feb. 5, 2019.

Sanchirico, et al, "AMITE: A Novel Polynomial Expansion for Analyzing Neural Network Nonlinearities," arXiv:2007.06226 [cs.LG]; DOI: 10.48550/arXiv.2007.06226; Jul. 13, 2020.

Juvekar, et al., Gazelle: A Low Latency Framework for Secure Neural Network Inference, Proceedings of the 27th USENIX Security Symposium, Aug. 2018.

Baruch, et al, "Fighting COVID-19 in the Dark: Methodology for Improved Inference Using Homomorphically Encrypted DNN," arXiv:2111.03362 [cs.CR], Nov. 2021.

* cited by examiner

NON-LINEAR APPROXIMATION ROBUST TO INPUT RANGE OF HOMOMORPHIC ENCRYPTION ANALYTICS

BACKGROUND OF THE INVENTION

Technical Field

This disclosure relates generally to the use of homomorphic encryption operations to facilitate inferencing against encrypted data.

Background of the Related Art

Homomorphic encryption is a form of encryption that permits users to perform computations on encrypted data without first decrypting that data. The computations are left in an encrypted form which, when decrypted, results in an identical output to that produced had the operations been performed on the unencrypted data. Recently, Privacy-Preserving Machine Learning (PPML) solutions have leveraged HE to obviate porting of sensitive data to the cloud. A solution of this type typically involves two entities: a user (the client), and a semi-honest cloud server that performs machine learning computation on HE-encrypted data. The user can train a model locally, encrypt it, and upload it to the cloud. In such case, the model architecture is not considered a secret from the user, only the cloud. Alternatively, the user can ask the cloud to train a model on its behalf over encrypted/unencrypted data and, at a later stage, the cloud performs inference operations on the user's behalf using the trained model. In some scenarios, the model is a secret and is not revealed to the user, who only receives the classification or prediction output.

FHE (Fully Homomorphic Encryption) schemes such as described above allow computing functions on encrypted data. They use the primitive operations add, multiply, and rotate elementwise on vectors of given sizes. When dealing with Machine Learning (ML) models such as Neural Networks (NN) or other analytics that incorporate non-linear functions, one needs to approximate these functions with the available primitive operations. Such approximations (usually polynomial in nature), however, are only valid within a certain range; outside of this range, values can dramatically change in magnitude (either become unproportionally huge compared to other values or diminish to approximately zero). Such dramatic errors of approximation can substantially affect the accuracy of the ML analytic.

Approximations of non-linear functions using primitive operations such as add, multiply, and rotate have long been discussed. Consequently, the challenge of tackling approximation errors (such as described above) has been met with different attempts towards a solution. In one approach (described by Juvekar, Chiraag, Vaikuntanathan and Chandrakasan), a framework for secure neural network inference is configured to decrypt results prior to any non-linear function, performs the calculation in the clear (instead of approximating over encrypted data), and then send the results to the other party for the remainder of the calculations. This solution has the disadvantage of increased communication per non-linear function, as well as decreased privacy due to the client-aided nature of the protocol. Another solution (proposed by Batch, Moran, Greenberg and Moshkowich) attempts to solve the challenge using batch-normalization to limit input value sizes to a certain range, but this type of solution cannot always keep the values to a certain range, and they are ineffective for some architectures and data types. Still others (e.g., Isik, Fatih, Gurkan Ozden, and Kuntalp) recommend non-linear transformations as part of the data pre-processing for the neural network. This latter approach, however, involves general-cleartext NN analytics, and the non-linear functions therein are not chosen to tackle the specific issues of FHE-friendly analytics.

There remains a need to solve the problem that polynomial estimates in FHE-friendly models are accurate only in a limited input range that is often hard to control in a complex model, such as a deep neural network.

BRIEF SUMMARY

A technique for privacy-preserving homomorphic inferencing using a machine learning model, such as a neural network having a non-linear approximation activation function. The neural network executes on a server, providing privacy-preserving machine learning (ML) over homomorphic encryption (HE) ("ML over HE"). During training, the neural network is trained to learn input features of an input feature vector together with normalized inverses (reciprocals) of those input features. During inferencing, an encrypted data point is received at the server from a requesting client. The encrypted data point comprises an input feature vector that has been extended with a set of one or more additional feature values, the set of one or more additional feature values having been generated by applying a normalized inverse function to respective one or more features in the feature vector. The normalized inverse function, which is applied by the client, computes an inverse of each feature value in the input feature vector and normalizes resulting inverse feature values into a limited common range (e.g., between [0, 1]). At the server, homomorphic inferencing is performed on the encrypted data point using the machine learning model to generate an encrypted result, which is then returned to the requesting client. The non-linear approximation activation function of the neural network may be a high-degree polynomial, e.g., one that estimates a RELU function. By applying the normalized inverse function, the high-degree polynomial can use any value of an input feature during inferencing, whether the value is within or outside of a particular input range.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
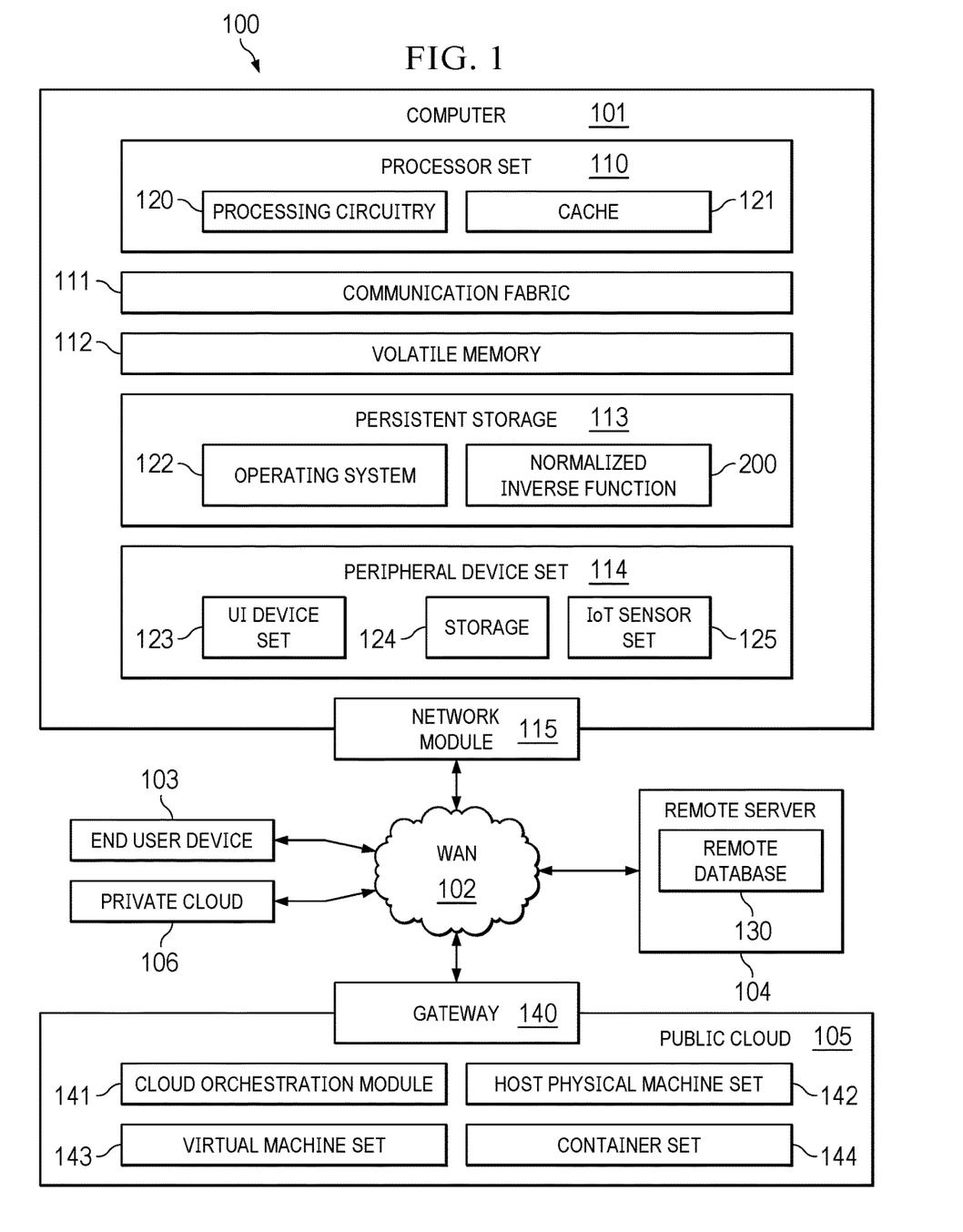
FIG. 1 depicts an exemplary block diagram of a data processing system in which exemplary aspects of the illustrative embodiments may be implemented.

Computing environment 100 contains an example of an environment for the execution of at least some of the computer code involved in performing the inventive methods, such as the normalized inverse function code 200 of this disclosure. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Machine Learning

Algorithms used in machine learning include supervised learning. Supervised learning involves feedback to indicate when a prediction is right or wrong. In supervised learning, a data set includes its desired outputs (or labels) such that a function can calculate an error for a given prediction. The supervision comes when a prediction is made and an error produced (actual vs. desired) to alter the function and learn the mapping. Learning in the supervised model entails creating a function that can be trained by using a training data set, then applied to unseen data to meet some predictive performance. The goal is to build the function so that it generalizes well over data it has never seen. Typically, a mapping function it built and tested with supervised learning in two phases. In a first phase, a data set a segmented into two types of samples: training data and test data. Both training and test data contain a test vector (the inputs) and one or more known desired output values. The mapping function is trained with the training data set until it meets some level of performance (a metric for how accurately the mapping function maps the training data to the associated desired output). In the context of supervised learning, this occurs with each training sample, where the error (actual vs. desired output) is used to alter the mapping function. In the next phase, the trained mapping function is tested against the test data. The test data represents data that has not been used for training and provides a good measure for how well the mapping function generalizes to unseen data.

Numerous algorithms exist for supervised learning. These include support vector machines, naïve Bayes, and many others. These algorithms are implemented in various architectures, such as neural network and decision trees.

Deep Neural Networks

By way of additional background, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers correspond to high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit (RELU), etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters, $\theta$. More formally, let $D=\{x_i, z_i\}^T_{i=1}$ be the training data, where $z_i \in [0, n-1]$ is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data. A neural network processes an input vector to a resulting output vector through a model inspired by neurons and their connectivity in the brain. The model consists of layers of neurons interconnected through weights that alter the importance of certain inputs over others. Each neuron includes an activation function that determines the output of the neuron (as a function of its input vector multiplied by its weight vector). The output is computed by applying the input vector to the input layer of the network, then computing the outputs of each neuron through the network (in a feed-forward fashion).

More formally, a Neural Network (NN) is a function g: $X \rightarrow Y$, where X is an input space, and Y is an output space representing a categorical set in a classification setting (or a real number in a regression setting). For a sample x that is an element of X, $g(x)=f_L(f_{L-1}(\ldots((f_1(x))))$. Each $f_i$ represents a layer, and $f_L$ is the last output layer. The last output layer creates a mapping from a hidden space to the output space (class labels), typically through a softmax function that outputs a vector of real numbers in the range [0, 1] that add up to 1. The output of the softmax function is a probability distribution of input x over C different possible output classes.

Machine learning algorithms typically require a numerical representation of objects for the algorithms to do processing and statistical analysis. In machine learning, feature vectors are used to represent numeric or symbolic characteristics, called features, of an object Homomorphic Encryption Homomorphic encryption (HE) is a public-key encryption scheme that in addition to the usual functions Enc, Dec (see below) also provides functions to perform operations on encrypted data (usually addition and multiplication). The encryption operation Enc: $\mathcal{R}_1 \rightarrow \mathcal{R}_2$ encrypts input plaintext from the ring $\mathcal{R}_1(+,*)$ into ciphertexts in the ring $\mathcal{R}_2(\oplus,\odot)$, and its associated decryption operation is Dec:: $\mathcal{R}_2 \rightarrow \mathcal{R}_1$. An HE scheme is correct if for every valid input x, $y \in \mathcal{R}_1$: Dec(Enc(x))=x, Dec(Enc(x)$\oplus$Enc(y))=x+y, and Dec(Enc(x)$\odot$Enc(y))=x*y, and is approximately correct (as in CKKS) if for some small $\epsilon > 0$ that is determined by the key, it follows that $|x - Dec(Enc(x))| \le \epsilon$. The addition and multiplication equations are modified in the same way. For schemes that support SIMD (Single Instruction Multiple Data), additions and multiplications are applied slot-wise on vectors.

Several HE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations.

Some HE schemes, such as CKKS, operate on ciphertexts in a homomorphic Single Instruction Multiple Data (SIMD) fashion. This means that a single ciphertext encrypts a fixed-size vector, and the homomorphic operations on the ciphertext are performed slot-wise on the elements of the plaintext vector. To utilize the SIMD feature, more than one input element is packed and encrypted in every ciphertext. This ciphertext packing enables parallelization of addition and multiplication operations. That said, the packing method used can dramatically affect the latency (i.e., time to perform computation), throughput (i.e., number of computations performed in a unit of time), communication costs, and memory requirements. Comparing numbers under HE and specifically CKKS often relies on polynomial approximations of the Step( ) or Sign( ) functions, whereas the accuracy and performance of these methods rely on the degrees of these polynomials. These comparison functions are denoted by Eq(x, y)$\approx 1 \Leftrightarrow x=y$, and Eq$\approx 0$ otherwise.

More generally, homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

Machine Learning-as-a-Service Using Homomorphic Encryption (ML Over HE)

Figure 2:
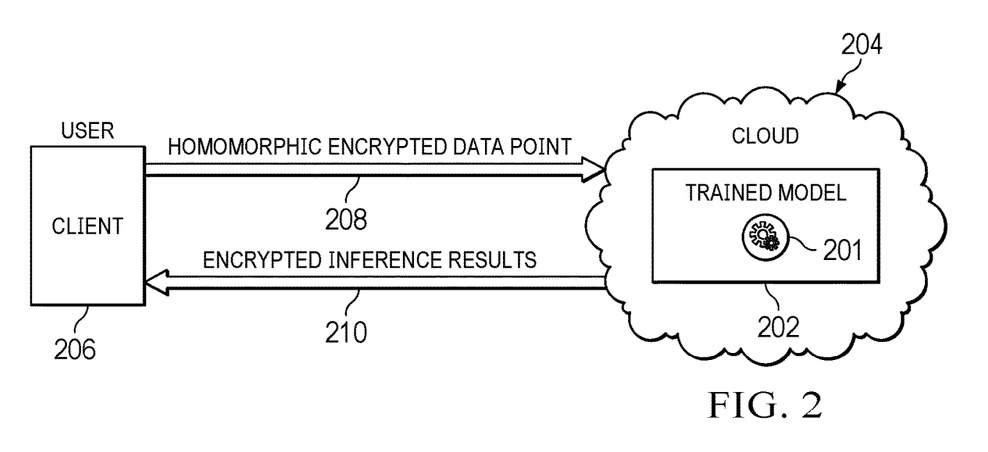
FIG. 2 is a representative Machine Learning as-a-service (MLaaS) operating environment in which the techniques of this disclosure may be implemented.

With reference now to FIG. 2, a representative (but non-limiting) operating environment for the technique herein is depicted. As shown, in a typical machine learning (ML) as a service scenario, a trained model such as a decision tree 201 is hosted on a cloud server 202 (sometimes referred to herein as Cloud) in a cloud computing infrastructure 204 such as described above. The model/tree (or other decision logic) 201 may be exposed as an Application Programming Interface (API) on the cloud 204. In operation, and as a service, the hosting cloud server 202 allows users to run inference queries on the model/tree 201. Typically, a user (sometimes referred to herein as Client) is associated with a client machine 206, and the client and server are configured to operate according to a client-server model. A homomorphic encryption (HE) protocol is enforced across the client-server operating environment such that the Cloud protects the model's privacy while users (Clients) maintain the privacy of their scoring data points returned by the model/tree. In a typical request-response workflow, the client 206 sends an encrypted query 208 (e.g., a data point) to the cloud server 202, the cloud server 202 applies the model/tree 201 and then returns a response 210. The response includes the encrypted inference results. In this manner, privacy-preserving inference problems are securely evaluated.

Thus, as depicted in FIG. 2, the Client homomorphically-encrypts its data points and shares them with the Cloud. In this example embodiment, the Cloud then uses the public key received from the Client to encrypt its model, and it homomorphically-evaluates the decision tree on the encrypted data points. In a variant embodiment, the Cloud does not need to encrypt its model before using it on inference on the encrypted data point supplied by the user. This is because CKKS (and other schemes) allow computations to be performed that involve both ciphertexts (like the user's data point) and plaintexts (e.g., the Cloud's model).

Generalizing, and as described above, PPML that use HE (sometimes referred to herein as ML over HE) typically involve two entities: a user (client), and a semi-honest cloud server that performs Machine Learning (ML) computation on HE-encrypted data. The user can train a model locally, encrypt it, and upload it to the cloud. In such a case, the model architecture and its weights are not considered a secret from the user, but only from the cloud. Alternatively, the user can ask the cloud to train a model on her/her behalf over encrypted/unencrypted data and, at a later stage, perform inference operations (again, on the user's behalf) using the trained model. In some scenarios, the model is a secret and should not be revealed to the user, who receives only the classification or prediction output (the result of the inferencing). It is assumed that all communications between all entities are encrypted using a secure network protocol, e.g., TLS 1.3, that provides confidentiality and integrity, and that allows the users to authenticate the cloud server.

Fully Homomorphic Encryption (FHE) (such as enabled by the CKKS scheme described above) allows data to remain encrypted during computation, regardless of the cloud or infrastructure used to process it.

An analytic that works efficiently in association with an HE scheme is sometimes referred to as "FHE-friendly."

As noted above, polynomial estimates in FHE-friendly models are accurate only in a limited input range, which range is often hard to control in a complex model such as a deep neural network. When translating an analytical model to be FHE-friendly then, one needs to resolve the issue that, by the time pre-normalized inputs reach the polynomial approximation, they might be out of any pre-designed approximation range. This disclosure addresses this problem, as is now described.

Non-Linear Approximation Robust to Input Range of the HE Analytic

Figure 3:
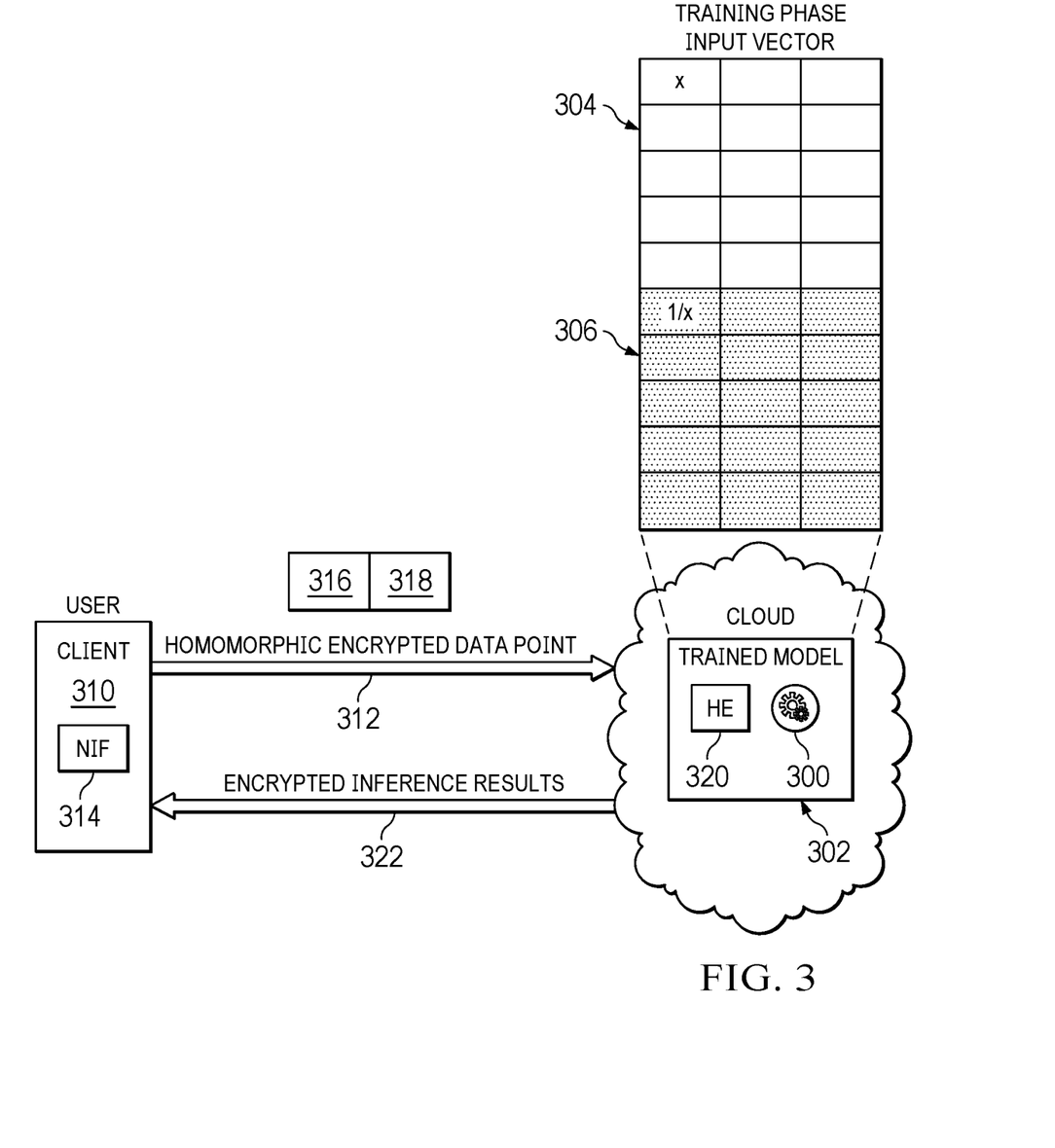
FIG. 3 depicts a client-to-server workflow utilizing the techniques of this disclosure.

According to this disclosure, a method and system for non-linear approximation robust to input range is provided for homomorphic encryption analytics. A representative implementation is a privacy-preserving homomorphic inferencing scheme such as described above. As depicted in FIG. 3, the homomorphic inferencing typically is carried out using a machine learning model 300 that executes on a server 302. The machine learning model typically is a neural network having a non-linear approximation activation function. In one embodiment, the activation function is a high-degree polynomial that estimates a Rectified Linear Unit (RELU), although this is not a limitation. In this embodiment, the neural network is a deep neural network that provides privacy-preserving ML over HE, although once again this operating environment is not intended to be limited. According to this disclosure, and during a training phase, the neural network is trained to learn both the input features of an input feature vector 304, as well as the normalized inverse (reciprocal) 306 of each such input feature. Thus, and as depicted, training data applied to the neural network preferably includes value x of an input feature 304, as well as the reciprocal 306 of the value, namely 1/x. The information about x thus flows into the neural network and has an effect on the high-degree polynomial both when x is small or large. In particular, and during the training phase, the neural network learns to stabilize x (using 1/x) and 1/x (using x). Stated another way, during training the model combines the inverse inputs and learns how to use them to tackle any exponential growth or reduction in values caused by the high-degree polynomial when input values are not within some tightly-constrained input range. This training improves the neural network by enabling its non-linear approximation (provided by the high-degree polynomial) to be robust to inputs that are not within that input range.

During inferencing, a requesting client 310 generates an encrypted data point 312. According to this disclosure, the requesting client executes a normalized inverse function (NIF) 314, typically as computer program code executed by a processor of a host processing system on which the client executes. In the illustrated embodiment, NIF 314 is an example of the normalized inverse function 200 of FIG. 1. The encrypted data point 312 comprises an input feature vector 316 that has been extended with a set of one or more additional feature values 318, the set of one or more additional feature values 318 having been generated by applying the normalized inverse function 314 to respective one or more features in the feature vector. The normalized inverse function 314 computes an inverse of each feature value in the input feature vector and normalizes resulting inverse feature values into a limited common range (e.g., between [0, 1]). Any normalization function (e.g., capping value beyond a maximum/minimum limit) may be used for the normalization. Preferably, the inverse of every input feature of the neural network, normalized to remain within the limited range, is added as an additional input to the neural network. This ensures that information about the feature can be used by the high-degree polynomial when x is both small or large.

At the server 302, the encrypted data point 312 is received. At 320, homomorphic inferencing is performed on the encrypted data point 312 using the machine learning model to generate an encrypted result 322, which is then returned back to the requesting client to complete the ML over HE operation.

Figure 4:
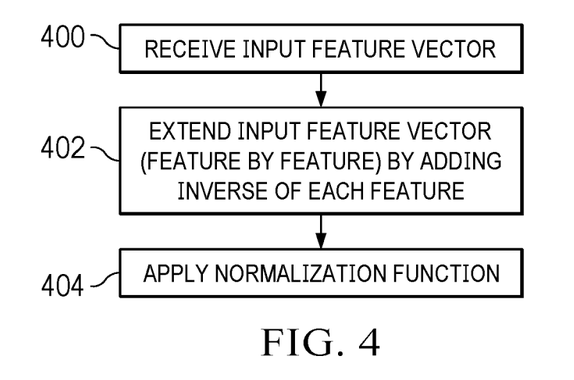
FIG. 4 depicts a process flow for the normalized inverse function of this disclosure.

FIG. 4 depicts a process flow of the normalized inverse function. At step 400, an input feature vector is received. At step 402, the function extends the received input feature vector by adding the inverse of each feature into the vector to generate an extended input feature vector. At step 404, the function normalizes the extended input feature vector into limited common range. In a concrete example, and given an x input, the normalized inverse function adds a 1/x per feature (normalized to [0, 1]). In the illustrated embodiment, the process flow of FIG. 4 is performed by tnen normalized inverse function 200 of FIG. 1.

The technique herein provides significant advantages. It enables polynomial estimates in FHE-friendly models to be accurate over a broad input range, including for input values that are within the input range of the polynomial as well as outside that input range. Extending the input feature vector with the normalized inverse function (as described herein) improves analytical model evaluation. The approach is both HE-friendly and does not impact latency. The solution enables those models to provide enhanced privacy-preserving inferencing in many different contexts, and it solves the out-of-range issue associated with polynomial approximation evaluation. More generally, the approach improves the accuracy of the machine learning classification by making the neural network more FHE-friendly. As noted, all of these advantages are achieved by extending the set of input features to also include reciprocals of the original set of inputs. In so doing, the approach improves the probability that the polynomial approximation remains accurate enough so as to maintain the overall accuracy of the neural network's inferences.

In an example implementation, the techniques herein are implemented in IBM® HE4Cloud, an FHE service that enables data scientists to deploy privacy preserving machine learning driven Software-as-a-Service (SaaS) applications in the cloud. The FHE service is powered by HELayers, an FHE Artificial Intelligence (AI) Software Development Kit (SDK). HELayers also provides a tile tensors framework that abstracts the packing decision for the user.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes, and they are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the HE system and the normalized inverse function code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular homomorphic encryption protocol such as CKKS, but this will be a typical implementation. More generally, the approach herein may be implemented in CKKS, any CKKS derivative, or in any similar HE scheme that supports real values with scaling.

The techniques herein provide for improvements to another technology or technical field, namely, homomorphic inferencing systems, as well as improvements to the operational capabilities of such systems when used in the manner described.

The nature of the data that is subject to the homomorphic inferencing is dependent on the application and is not intended to be limited. Example data types include financial, medical, genomic, measurement data, testing data, and so forth.

While the approach herein has been described in the context of a neural network having a non-linear approximation activation function, this is not a limitation; the described approach is also valid for any polynomial approximation function associated with the machine learning model.

Having described the subject matter, what is claimed is as follows:

1. A method for privacy-preserving homomorphic inferencing, comprising:
   receiving an encrypted data point at a machine learning model, the machine learning model having an activation function, the encrypted data point comprising an input feature vector that has been extended with a set of one or more additional feature values, the set of one or more additional feature values having been generated by applying a normalized inverse function to respective one or more features in the input feature vector, wherein the normalized inverse function computes a reciprocal value of each feature value in the input feature vector and normalizes resulting reciprocal values into a common range, and wherein the set of one or more additional feature values comprises a reciprocal value for every input feature value in the input feature vector;
   performing homomorphic inferencing on the encrypted data point using the machine learning model to generate an encrypted result; and
   returning the encrypted result in response to the encrypted data point.

2. The method as described in claim 1 wherein the machine learning model is a neural network.

3. The method as described in claim 2 wherein the neural network is a network that has been trained to learn input features of the input feature vector together with reciprocals of the input features.

4. The method as described in claim 1 wherein the activation function is a non-linear polynomial approximation and the input feature vector defines an input over an input range.

5. The method as described in claim 4 wherein applying the normalized inverse function enables the non-linear polynomial approximation to use a value of a particular input feature during homomorphic inferencing, whether the value is within or outside of the input range.

6. An apparatus, comprising:
   a processor; and
   computer memory storing computer program instructions executed by the processor to provide privacy-preserving homomorphic inferencing, the computer program instructions comprising program code configured to:

receive an encrypted data point at a machine learning model, the machine learning model having an activation function, the encrypted data point comprising an input feature vector that has been extended with a set of one or more additional feature values, the set of one or more additional feature values having been generated by applying a normalized inverse function to respective one or more features in the input feature vector, wherein the normalized inverse function computes a reciprocal value of each feature value in the input feature vector and normalizes resulting reciprocal values into a common range, and wherein the set of one or more additional feature values comprises a reciprocal value for every input feature value in the input feature vector;

perform homomorphic inferencing on the encrypted data point using the machine learning model to generate an encrypted result; and return the encrypted result in response to the encrypted data point.

7. The apparatus as described in claim 6 wherein the machine learning model is a neural network.

8. The apparatus as described in claim 7 wherein the neural network is a network that has been trained to learn input features of the input feature vector together with reciprocals of the input features.

9. The apparatus as described in claim 6 wherein the activation function is a non-linear polynomial approximation and the input feature vector defines an input over an input range.

10. The apparatus as described in claim 9 wherein applying the normalized inverse function enables the non-linear polynomial approximation to use a value of a particular input feature during homomorphic inferencing, whether the value is within or outside of the input range.

11. A computer program product in a computer readable storage medium, the computer program product storing computer program instructions that, when executed by one or more processors in one or more host processing systems, provide privacy-preserving homomorphic inferencing, the computer program instructions comprising program code configured to:

receive an encrypted data point at a machine learning model, the machine learning model having an activation function, the encrypted data point comprising an input feature vector that has been extended with a set of one or more additional feature values, the set of one or more additional feature values having been generated by applying a normalized inverse function to respective one or more features in the input feature vector, wherein the normalized inverse function computes a reciprocal value of each feature value in the input feature vector and normalizes resulting reciprocal values into a common range, and wherein the set of one or more additional feature values comprises a reciprocal value for every input feature value in the input feature vector;

perform homomorphic inferencing on the encrypted data point using the machine learning model to generate an encrypted result; and return the encrypted result in response to the encrypted data point.

12. The computer program product as described in claim 11 wherein the machine learning model is a neural network and the program code is further configured to train the neural network to learn input features of the input feature vector together with reciprocals of the input features.

13. The computer program product as described in claim 11 wherein the activation function is a non-linear polynomial approximation and the input feature vector defines an input over an input range.

14. The computer program product as described in claim 13 wherein applying the normalized inverse function enables the non-linear polynomial approximation to use a value of a particular input feature during homomorphic inferencing, whether the value is within or outside of the input range.

\* \* \* \* \*